(12) United States Patent
Rozenberg et al.

(10) Patent No.: US 10,127,375 B2
(45) Date of Patent: Nov. 13, 2018

(54) ENFORCING TRUSTED APPLICATION SETTINGS FOR SHARED CODE LIBRARIES

(71) Applicant: Protegrity Corporation, Grand Cayman (KY)

(72) Inventors: Yigal Rozenberg, Wilton, CT (US); Pierre Burlin, Skelleftea (SE); Jan Boberg, Skelleftea (SE)

(73) Assignee: Protegrity Corporation, Grand Cayman (KY)

( * ) Notice: Subject to any disclaimer, the term of this patent is extended or adjusted under 35 U.S.C. 154(b) by 250 days.

(21) Appl. No.: 15/061,837

(22) Filed: Mar. 4, 2016

(65) Prior Publication Data

US 2016/0259934 A1  Sep. 8, 2016

Related U.S. Application Data

(60) Provisional application No. 62/129,760, filed on Mar. 7, 2015.

(51) Int. Cl.
*G06F 21/44* (2013.01)
*G06F 21/45* (2013.01)
*H04L 29/06* (2006.01)

(52) U.S. Cl.
CPC .............. *G06F 21/44* (2013.01); *G06F 21/45* (2013.01); *H04L 63/102* (2013.01); *G06F 2221/2101* (2013.01); *G06F 2221/2137* (2013.01)

(58) Field of Classification Search
CPC .......... G06F 21/44; G06F 21/45; G06F 21/52; G06F 21/629; G06F 21/121; G06F 21/57; G06F 2221/2141; G06F 21/54; G06F 21/554; G06F 17/30082; G06F 21/30; G06F 21/62; G06F 21/566; G06F 2221/033; G06F 9/44521; G06F 8/70; G06F 8/54; G06F 9/54; G06F 8/44; G06F 9/466; G06F 21/60; G06F 21/53; G06F 21/621; G06F 2211/009; G06F 21/51; G06F 2221/2113; G06F 2221/2101; H04L 63/102; H04L 63/10; H04L 63/20; H04L 63/104

See application file for complete search history.

(56) References Cited

U.S. PATENT DOCUMENTS

| | | | |
|---|---|---|---|
| 8,863,256 B1 * | 10/2014 | Addepalli | H04W 4/046 726/7 |
| 9,208,328 B2 * | 12/2015 | Russello | G06F 21/60 |
| 9,210,170 B1 * | 12/2015 | Kim | H04L 63/10 |
| 9,288,193 B1 * | 3/2016 | Gryb | H04L 63/08 |

(Continued)

*Primary Examiner* — Minh Dinh
*Assistant Examiner* — Shu C Gao
(74) *Attorney, Agent, or Firm* — Fenwick & West LLP

(57) ABSTRACT

Access to a shared library API is restricted for a customer application by a security system. A profile for each of a plurality of trusted applications is generated and stored in a security database. When a customer application attempts to access the shared library API, the customer application is verified by extracting a customer application profile for the customer application, comparing the customer application profile with each stored trusted application profile, and verifying that the customer application can access the shared library API based on the comparison. Based on the verification, the customer application may be allowed to or access to the shared library API or may be prevented from accessing the shared library API.

21 Claims, 4 Drawing Sheets

(56) References Cited

U.S. PATENT DOCUMENTS

| | | | | |
|---|---|---|---|---|
| 9,509,697 | B1* | 11/2016 | Salehpour | G06F 21/52 |
| 2006/0075462 | A1* | 4/2006 | Golan | G06F 21/54 |
| | | | | 726/1 |
| 2006/0130144 | A1* | 6/2006 | Wernicke | G06F 21/52 |
| | | | | 726/24 |
| 2008/0005282 | A1* | 1/2008 | Gaedcke | G06F 17/30867 |
| | | | | 709/219 |
| 2012/0204255 | A1* | 8/2012 | Park | G06F 21/44 |
| | | | | 726/18 |
| 2013/0117804 | A1* | 5/2013 | Chawla | H04L 63/102 |
| | | | | 726/1 |
| 2013/0191882 | A1* | 7/2013 | Jolfaei | H04L 63/0807 |
| | | | | 726/4 |
| 2015/0019982 | A1* | 1/2015 | Petitt, Jr. | G06F 3/0481 |
| | | | | 715/738 |
| 2015/0128214 | A1* | 5/2015 | Maida-Smith | H04L 63/20 |
| | | | | 726/1 |

* cited by examiner

Trusted Application Profile
320

-Datastore ID
-Application ID
-Datastore Name
-Description
-Friendly Name
-Application Name
-Application User
-Audit Success

FIG. 3A

Customer Application Profile
322

-Friendly Name
-Application Name
-Application User

FIG. 3B

ENFORCING TRUSTED APPLICATION SETTINGS FOR SHARED CODE LIBRARIES

CROSS-REFERENCE TO RELATED APPLICATION

This application claims the benefits of U.S. Provisional Application No. 62/129,760, filed Mar. 7, 2015, which is hereby incorporated by reference in its entirety.

FIELD OF DISCLOSURE

This disclosure relates to security in a computing system, and in particular to enforcing access restrictions for shared code libraries.

BACKGROUND

Most software applications are configured to access shared code libraries of executable functions to execute application processes. A shared code library may be used to enable sensitive operations such as encryption and decryption, for instance by providing access to an encryption key. In such cases, the application accessing such a shared library should be a trusted application and should be authorized to access the application programming interface (API) exposed by such library. The API is a set of routines, protocols or tools that includes data structures, object classes, and other variables that are used to access a pre-compiled code such as a shared library. Additionally, the application accessing the shared library API should execute on an authorized computer system. Existing systems do not provide a solution to ensure these conditions are met when providing applications access to a shared library.

SUMMARY

In various embodiments, an administrative server ("admin server" herein) creates and stores trusted application configurations for various computer applications. The configuration of a trusted application includes a pre-determined set of properties of an application and an associated constraint for each property, for example, a flag setting that indicates if the property is required or optional for the trusted application configuration. Once a trusted application configuration is created, an admin server can configure and classify a customer application as a trusted application by comparing a profile of the customer application to the trusted application configuration. The profile of the customer application includes details of the customer application such as the user name of the application, file name, application file system location, data and time of execution of the customer application, and other such properties. Each property of the profile is compared to the corresponding property of the trusted application configuration to ensure that it complies with the associated constraint for the property. If the profile of the customer application complies with the constraints of the trusted application configuration, the profile of the customer application is classified as a trusted application and is stored in a database in the computer environment. If any of the properties in the profile of the customer application do not comply with a corresponding constraint of the trusted application configuration, the customer application is not classified as a trusted application.

A customer application may attempt to access a shared library (such as an encryption or decryption library) from the admin server. On every attempt to access the shared library API, the admin server ensures that the customer application is authorized to access the shared library. The attempt may be detected during an on-load event or on any other use of the shared library API by the customer application. To authorize the customer application, the admin server generates or accesses a profile of the customer application that attempts to load the shared library.

The admin server then searches the database for a trusted application that matches the customer application by comparing the profile of the customer application to each profile of the trusted application retrieved from the database. If a matching trusted application is found (a trusted application corresponding to a profile with a set of application property constraints that that the customer application profile satisfies), the admin server verifies that the customer application is authorized to access the shared library and if so, allows the customer application to access the shared library. Each trusted application configuration includes a set of application property constraints that can be provided by, for instance, a system administrator or a web security officer. The system administrator or web security officer can manually amend a trusted application configuration from a remote location or can chose to automatically amend the trusted application configuration based on certain conditions, such as periodically (every few days or months), or based on a new policy setting. To increase security further, each access to a shared library API is monitored by the admin server for subsequent auditing and security protocol adherence determinations.

BRIEF DESCRIPTION OF THE DRAWINGS

FIG. 3A illustrates an example of a trusted application profile as stored in a profile database, according to one embodiment.

FIG. 3B illustrates an example of a customer application profile that attempts to access a shared library, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
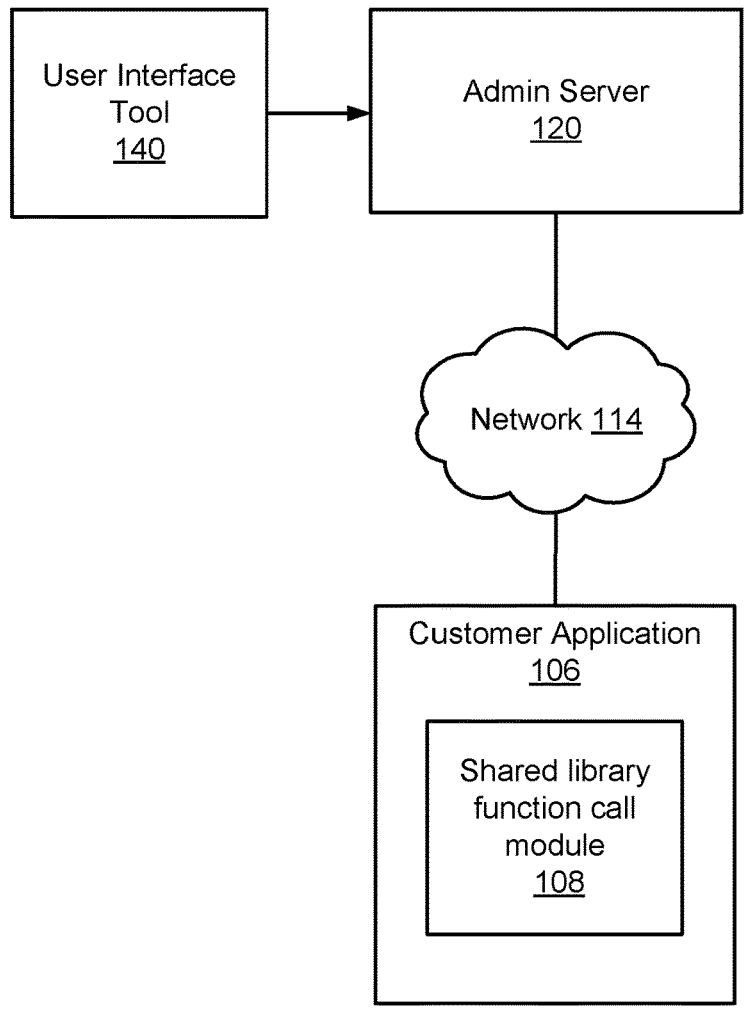
FIG. 1 illustrates an environment for enforcing a trusted application configuration to allow access to a shared library, according to one embodiment.

FIG. 1 illustrates an environment for enforcing a trusted application configuration to allow access to a shared library, according to one embodiment. The environment 100 includes a customer application 106, an admin server 120 communicating via a network 114 (e.g., a local area network or the internet), and a user interface tool 140 to allow an administrator or security officer to perform operations at the admin server 120. Examples of a customer application 106 include an online shopping application such as Amazon.com, etc., a payment application such as PayPal, etc., or any other such application. The customer applications 106, the admin server 120 and the user interface tool 140 can execute on one or more electronic devices. Electronic devices are computing devices capable of receiving user input as well as transmitting and/or receiving data via the network 114. In one embodiment, an electronic device is a smartphone, a tablet computer, a desktop computer, or a laptop computer. Alternatively, an electronic device may be a device having computer functionality that accesses a set of mobile applications.

The customer application 106 includes a shared library function call module 108 that performs a function call to access a shared library included in the admin server 120. For example, the function call module 108 may include a load (shared library) event that the admin server 120 translates to a request to access one of the shared library at the admin server 120.

Trusted Application Configuration

An admin server 120 includes a plurality of shared libraries, for example, encryption libraries that include encryption keys and modules, decryption libraries that include decryption keys and modules, and other such libraries. The admin server 120 includes controller logic for controlling the general operation of the admin server, such as managing the computational load of the admin server, installing new libraries at the admin server, and managing existing libraries and other such operations. The admin server is a special-purpose electronic device including one or more hardware processors, and one or more executable computer programs specially configured to govern access to shared files and libraries for one or more customer applications 106.

The admin server 120 determines properties of a trusted application configuration, and allows or restricts access to a shared library API for a customer application based on a comparison of a trusted application profile to a customer application profile. A customer application 106 may attempt to access a shared library stored by the admin server 120, for example, by initiating a function call to the shared library via the shared library function call module 108 of the customer application 106. The admin server 120 allows the customer application 106 to access the shared library only if the customer application 106 is authorized to access the shared library API. To verify the authorization of the customer application 106, the admin server 120 determines if the customer application 106 is configured as a trusted application.

The admin server 120 can configure a trusted application, for example, via a user interface tool 140 connected to the admin server 120. A user interface tool 140 is a software application that runs on an electronic device communicatively coupled to the admin server 120. In addition to configuring a trusted application, the user interface tool 140 allows a user (such as a web security officer) to adjust or reconfigure the properties of a trusted application configuration. The user interface tool 140 allows the web security officer to access the admin server 120 remotely (for instance, the user is not required to have physical access to the actual computer).

Figure 2:
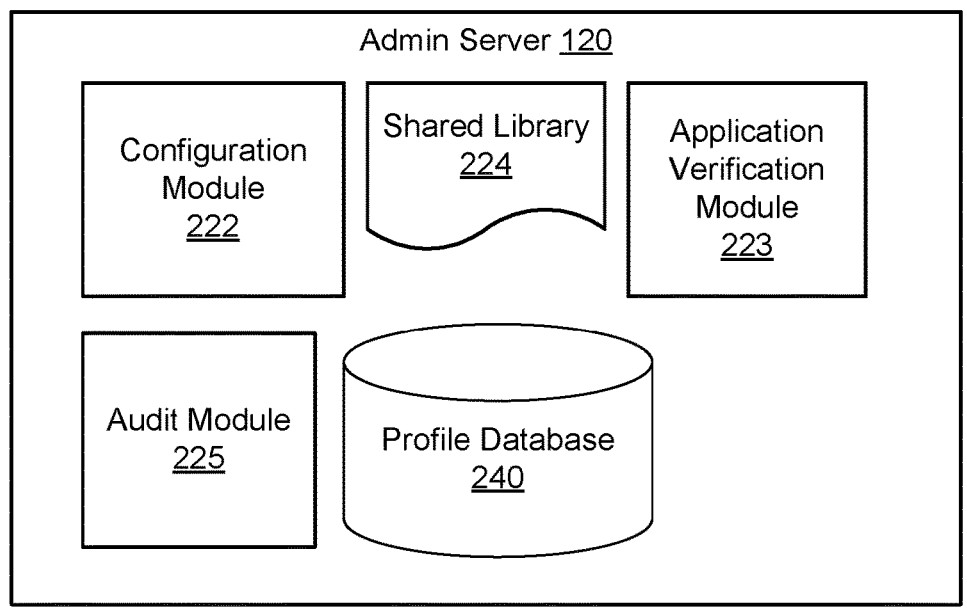
FIG. 2 illustrates the functional blocks of an admin server that enforces access to a shared library, according to one embodiment.

FIG. 2 illustrates the functional blocks of an admin server 120 that enforces access to a shared library, according to one embodiment. The admin server 120 includes a configuration module 222, a shared library 224, an application verification module 223, an audit module 225, and a profile database 240.

The configuration module 222 creates a trusted application configuration. The trusted application configuration is defined as a set of application properties, application values, and constraints that, when satisfied, authorize an application to access a shared library. Each property may include a flag indicating that the property is optional or that the property is required in order to authorize a customer application. In response to determining that a customer application can access a shared library (for instance, in response to the comparison of a customer application profile with a trusted application profile, or in response to an explicit authorization request from a security officer or administrator), the configuration module 222 can extract a profile of the customer application 106 for storage as a trusted application (for instance, for subsequent customer application authorization determinations). A customer application profile includes properties of the customer application, for example, system information describing a computing system that the customer application 106 runs on, a description of the customer application 106, a configuration name of the customer application 106, and the like. A customer application profile can include the following fields:

1. Configuration name: a name used to identify the customer application 106, for example, shopping cart, order entry, etc.
2. Description: a description of the usage of the configuration of the customer application 106, for example, "data protection", "media generation", etc.
3. Application name: a name of the customer application (e.g., the name of a process or class of the customer application) accessing the shared library API.
4. Application user: the user name of the user of the customer application.
5. Audit Success: a flag that can be set to true to generate an audit trail when an authorized customer application accesses the shared library API, or alternatively a flag that can be set to false when a customer application is not authorized to access the shared library API.
6. Allowed data store(s): an identifier for each of one or more data stores accessible to the trusted application.

In some embodiments, a value for each property of the application profile (or simply "profile", hereinafter) is received from the customer application 106. In some embodiments, the profile is extracted from the customer application when the customer application 106 attempts to access the shared library 224 API. In some embodiments, the profile is retrieved from an audit record. For example, if a customer application 106 is not authorized to access the shared library, the profile of the customer application 106 is extracted and stored in an audit record by the audit module 225 that may be accessed later by the configuration module 222.

Each property of the customer application 106 profile is analyzed to determine if it complies with the properties and constraints defined by a trusted application configuration to determine if the customer application can access to the shared library 224 API. For example, if the "configuration name" of a trusted application profile is a required property, the configuration module 222 ensures that the customer application profile includes the "configuration name" property before providing authorizing the customer application. Further, if a constraint is associated with the configuration name property, i.e., the configuration name is required to include only alpha numeric characters, the configuration module 222 can deny authorization to a customer application if the customer application profile includes characters other than letters and numbers.

Once the configuration module 222 ensures that the customer application 106 profile complies with the trusted application configuration (e.g., satisfies each property requirements, constraint, etc.), the customer application 106 profile is classified as a trusted application. For example, a trusted application flag may be appended to the customer application profile to indicate that the customer application profile is a trusted application. The customer application profile and appended trusted application flag is stored in the profile database 240. An example profile of a customer application 106 as stored in the profile database 240 is described below with respect to FIG. 3B.

Additionally, the configuration module 222 allows adding a trusted application to the profile database 240, removing/ deleting a trusted application from the profile database 240, and updating or retrieving a trusted application from the profile database 240 via the user interface tool 140. The access to the configuration module 222 and the profile database 240 is subject to authentication. The authentication may be role-based, to ensure that an authenticated user performs the operations of adding, removing, updating or retrieving trusted applications, for example, a web security officer that has permissions to add/remove/update or access a trusted application. To update a profile of a trusted application stored in the profile database 240, a user can retrieve a specific profile of a trusted application from the profile database 240 by conducting a search via the user interface tool 140. The search can be based on keywords of any property of the trusted application, for example, a user can search based on an application name or a configuration name or any other such property. Once a trusted application is retrieved, it can be updated or deleted via the user interface tool 140.

A shared library 224 includes a set of libraries that can be accessed by an executing customer application 106. Each set of libraries may include one or more instances of pre-compiled code to be shared between several customer applications 106. For example, a security-based shared library for encryption may include encryption modules. Each encryption module may perform an encryption algorithm (such as an RSA algorithm, a secure hash algorithm, and other such algorithms). Using a shared library 224 reduces disk space by loading a single copy of the pre-compiled code in a shared memory and reduces processing time by associating a single load event with the shared libraries 224.

As noted above, a shared library 224 may be accessed via an API. A customer application 106 attempts to access the shared library 224 API via a "load" function call performed by the shared library function call module 108. The admin server 120 can intercept such calls to the shared library, can make an authorization determination of the customer application in response to intercepting such a call, and can allow or deny access to the shared library in response to the authorization determination.

Profile Database

The profile database 240 may include one or more non-transitory computer-readable memories to store a profile for each of a plurality of trusted applications. In one embodiment, an audit record or an audit trail associated with a customer application 106 that attempts to access the shared library is also stored in the profile database 240. The admin server 120 stores a customer application profile as a trusted application in a database entry to the profile database 240. Example database entries are described in detail below with respect to FIG. 3A and FIG. 3B.

Verification of Customer Application Consuming the API

The application verification module 223 verifies the profile of a customer application 106 to determine if the customer application is authorized to access the shared library API. The application verification module 223 detects an attempt by the customer application 106, to access a shared library API, for example, in response to the execution of a function by the customer application API that makes a call to access the shared library API and the subsequent interception of the call by the application verification module. In response to the attempt, the application verification module 223 verifies that the customer application is authorized to access the shared library API. To verify the customer application, the verification module 223 extracts the profile of the customer application 106. Further, profiles of a plurality of trusted applications are retrieved from the profile database 240. The extracted customer application profile is compared to each retrieved trusted application profile to determine if the customer application profile satisfies the property requirements or constraints of one or more trusted application profiles.

The verification module searches the profile database 240, for instance based on a keyword search of one of the properties of the customer application profile. For example, the profile database 240 is searched based on the application name (such as "shopping cart") of the customer application 106. If one or more trusted application profiles from the profile database 240 match the keyword, each property of the customer application profile is compared to the corresponding property of the matched trusted application profiles. For example, two trusted application profiles may match the application name "shopping cart": 1) an application named "shopping cart wholesale", and 2) an application named="shopping cart". Each property of the customer application profile is compared to the corresponding property of the matched trusted application profiles, and if a predetermined threshold number of properties of the customer application profile match the corresponding properties of one of the trusted application profiles, the customer application is verified as a trusted application.

If the customer application is verified as a trusted application, the verification module 223 authorizes the customer application 106 to access the shared library API. If the customer application is not verified as a trusted application, the verification module 223 does not allow the customer application 106 to access the shared library API. In one embodiment, the verification module 223 sets a success status flag that indicates the status of authorization of the customer application 106. If the customer application is authorized to access the shared library API, the verification module 223 sets the success status flag to true. If the customer application is not allowed to access the shared library API, the verification module 223 sets the success status flag to false. The success status flag of the customer application 106 is sent to the audit module to so that audit actions can be performed based on the success status flag, such as starting an audit trail for the customer application 106 and generating an audit record for the customer application 106.

An audit module 225 generates audit records for all attempts to access the shared library 224, including requests from customer applications 106 that are not authorized to access the shared library 224. Each audit record includes information related to the attempt to access the shared library 224, for example, the customer application profile, the success status flag, the date and time of attempt to access the shared library 224, and other such information. The audit module 225 receives the success status flag from the verification module 223 and based on the success status flag value, determines that an unauthorized attempt of a customer application 106 to access the shared library 224.

The audit module 225 extracts the profile of the unauthorized customer application and includes it with the audit record. In one embodiment, the audit module 225 may generate an exception event or an error message to extract the customer application profile. The audit record is stored as a database entry in the profile database 240. In some embodiments, a system administrator or security officer can perform subsequent security actions based on the result an audit record, such as quarantining access to a shared library, quarantining actions from a particular customer application, and the like.

In some embodiments, a customer application 106 may not be authorized on a first attempt to access the shared library 224 since the verification module 223 did not successfully compare the customer application profile to a trusted application profile stored in the profile database 240. In such cases, the configuration module 222 may retrieve an audit record of the unauthorized customer application, can receive approval for the customer application from a security officer or system administrator based on the audit record, and can extract the customer application profile to configure the customer application 106 as a trusted application.

FIG. 3A illustrates an example of a trusted application profile 320 as stored in the profiled database 240, according to one embodiment. The configuration module 222 selects a list of properties to include within the profile of a trusted application along with an associated constraint for each property, for example, a flag setting that indicates if the property is required or optional for the trusted application configuration. Each trusted application profile 320 is stored as a database entry in the profile database 240. The datastore ID and database name fields indicate a database identifier for the database entry to enable subsequent access to and retrieval of one or more trusted application profiles. For example, each database name may include one or more data stores, and each data store can include a unique identifier field identifying the trusted application profiles stored within the data store, for example, data store id=001 may include all the trusted application profiles within a banking application classification, etc.

As illustrated in FIG. 3A, the trusted application profile 320 includes a "description" field, a "friendly name" field, an "application name" field, and an "application user" field. The "description" field includes a description of the use, purpose, or functionality of the trusted application. This field may be marked as a required property and may be associated with a constraint to include alpha numeric characters only. The "application name" field includes a name of the customer application 106 that attempts to access the shared library API. The "application user" field includes the operating system user name associated with the customer application. An "audit success" field may reflect the last known status of an authorization of a customer application on an attempt to access the shared library API.

An administrator or a web security officer may configure via the user interface tool 140 each property within the trusted application profile 320 to either be a required property or an optional property. A web security officer may perform a keyword search using any one of the properties of the trusted application profile 320 to retrieve trusted applications from the profile database 240.

FIG. 3B illustrates an example of a customer application profile that attempts to access a shared library, according to one embodiment. As described above, an audit module 225 may send an exception or an error message to extract a customer application profile of an unauthorized customer application. The exception or error message may include code to extract the profile of the customer application 106. The extracted customer application profile may include a "friendly name" field, an "application name" field, and an "application user" field.

By utilizing the trusted application profile 320 described in FIG. 3A, the admin server 120 reduces the risk of an unauthorized access (for example, a hacker attempt) of the shared library API. Unauthorized accesses may include copying the shared library API to another computer system.

Figure 4:
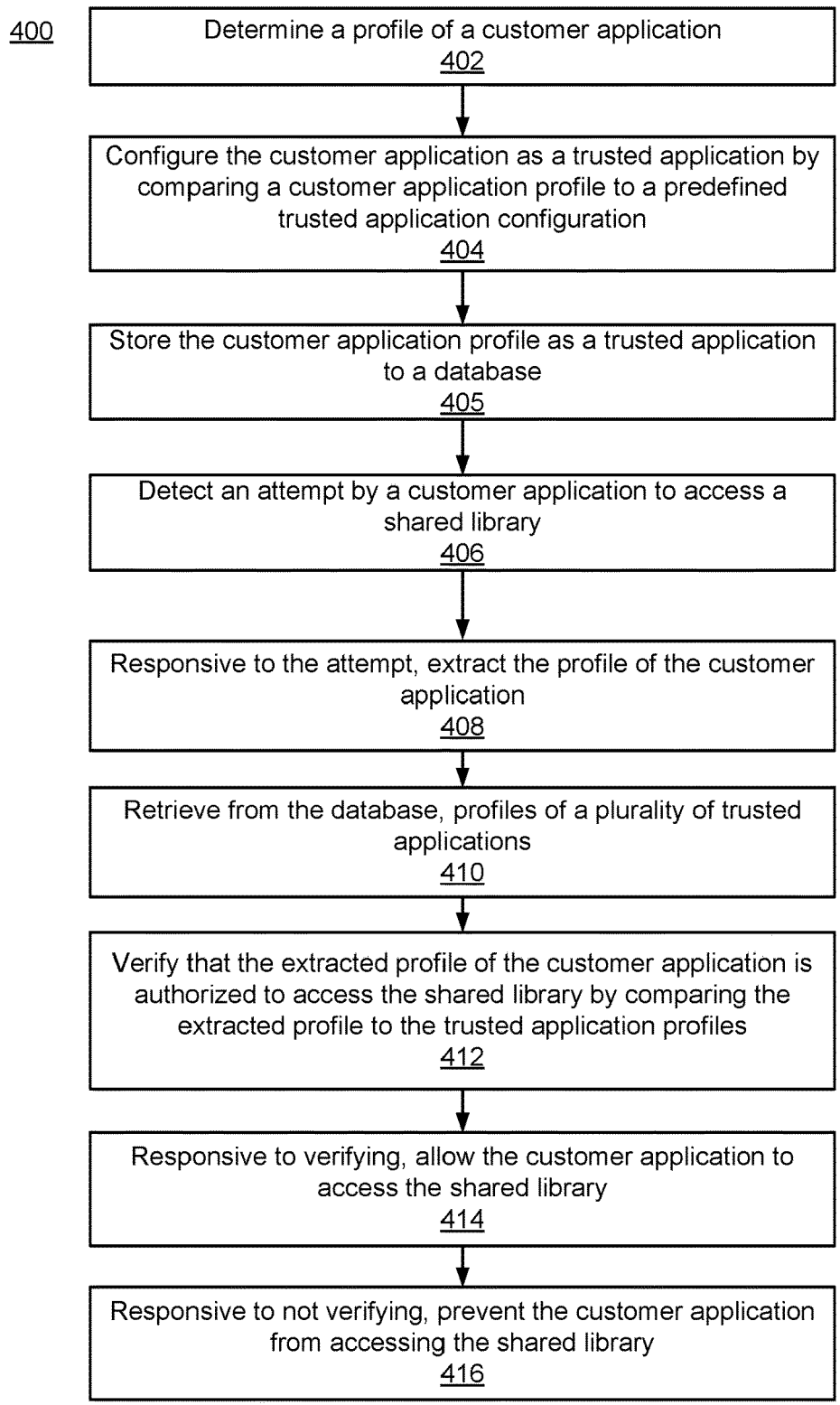
FIG. 4 illustrates a method of enforcing access to a shared library, according to one embodiment.

FIG. 4 illustrates a method of enforcing access to the shared library, according to one embodiment. An admin server 120 determines 402 a profile of a customer application 106. The determination may be in response to an attempt from the customer application to access a shared library API, or a customer application 106 may request the admin server 120 to verify that it a trusted application. In some embodiments, a web security officer may receive a list of customer applications (for instance, compiled in response to requests from the customer applications) for verification as trusted applications.

The admin server 120 creates a pre-determined list of required application properties and application values along with associated constraints that make up a trusted application configuration. To configure 404 a customer application as a trusted application, the admin server 120 compares each property of a customer application profile to a corresponding property of a trusted application configuration to ensure that each compared property of the customer application complies with the constraints associated with the property of the trusted application configuration. If the customer application profile complies with the trusted application configuration, the customer application profile is stored 405 as a trusted application in the profile database 240.

The admin server 120 detects 406 an attempt by a customer application 106 to access a shared library API. For example, the customer application API may instantiate a call to access the shared library 224 API. In response to the attempt, the admin server 120 extracts 408 the profile of the customer application 106. Additionally, the admin server 120 will retrieve 410 the profile of one or more trusted applications from the profile database 240. For example, the admin server 120 can iterate through (e.g., via a hash table or index) the profiles of the trusted applications to identify a set of trusted application profiles that correspond to the customer application profile.

The admin server 120 verifies 412 that the customer application is authorized to access the shared library by comparing properties of the customer application profile to corresponding properties of each of the set of trusted application profiles. If the customer application profile satisfies the application property requirements and constraints of a trusted application profile (or "matches" the trusted application profile), the admin server 120 confirms that the customer application is authorized to access the shared library API and allows 414 the customer application to access the shared library API. If the verification fails, (for instance, if a match is not found or the matching application is not marked as a trusted application), the admin server 120 prevents 416 the customer application 106 from accessing the shared library 224 API. An audit record is generated by the audit module 225 to record the status of authorization for each attempt by a customer application 106 to access the shared library API.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method of restricting access to a shared library within a computer security system, the method comprising:
   storing, by a security database for each of a plurality of trusted applications, a trusted application profile identifying a set of application constraints each associated with an application property that must be satisfied before an application can access a shared library;
   detecting, by an administrative server, an attempt from a customer application to access the shared library;
   responsive to the attempt, generating, by the administrative server, a profile of the customer application, the customer application profile representative of a set of properties of the customer application, each property of the set of properties represented by the customer application profile corresponding to a constraint identified by a trusted application profile;
   retrieving, by the administrative server from the security database, a profile for each trusted application of a set of trusted applications;
   comparing the customer application profile to each retrieved trusted application profile by comparing each property of the customer application represented by the customer application profile to the corresponding constraint identified by the retrieved trusted application profile;
   responsive to a successful comparison between the customer application profile and at least one trusted application profile, verifying, by the administrative server, that the customer application can access the shared library;
   responsive to verifying that the customer application can access the shared library, allowing, by the administrative server, the attempt from the customer application to access the shared library; and
   responsive to not verifying that the customer application can access the shared library, denying, by the administrative server, the attempt from the customer application to access the shared library.

2. The method of claim 1, wherein each trusted application profile includes one or more of: a trusted application name, a trusted application user, a trusted application host id, a location of the trusted application within a computer system, an access date and time of the trusted application, and an internet protocol address of a system that executes the trusted application.

3. The method of claim 1, wherein one or more trusted application profiles are received from a system administrator.

4. The method of claim 1, wherein the customer application is verified in response to each application constraint in a trusted application profile being satisfied by the customer application profile.

5. The method of claim 1, wherein an audit record is created for the customer application in response to denying the attempt from the customer application to access the shared library.

6. The method of claim 1, wherein determining an attempt from a customer application to access the shared library comprises intercepting a call to an API of the shared library from a function of the application.

7. The method of claim 1, wherein responsive to verifying that the customer application can access the shared library further comprises storing the customer application profile in the security database as a trusted application profile.

8. An administrative server computer system for restricting access to a shared library, the administrative server comprising a hardware processor and a security database, the hardware processor configured to perform steps comprising:
 storing, in the security database for each of a plurality of trusted applications, a trusted application profile identifying a set of application constraints each associated with an application property that must be satisfied before an application can access a shared library;
 detecting an attempt from a customer application to access the shared library;
 responsive to the attempt, generating a profile of the customer application, the customer application profile representative of a set of properties of the customer application, each property of the set of properties represented by the customer application profile corresponding to a constraint identified by a trusted application profile;
 retrieving a profile for each trusted application of a set of trusted applications;
 comparing the customer application profile to each retrieved trusted application profile by comparing each property of the customer application represented by the customer application profile to the corresponding constraint identified by the retrieved trusted application profile;
 responsive to a successful comparison between the customer application profile and at least one trusted application profile, verifying that the customer application can access the shared library;
 responsive to verifying that the customer application can access the shared library, allowing the attempt from the customer application to access the shared library; and
 responsive to not verifying that the customer application can access the shared library, denying the attempt from the customer application to access the shared library.

9. The administrative server of claim 8, wherein each trusted application profile includes one or more of: a trusted application name, a trusted application user, a trusted application host id, a location of the trusted application within a computer system, an access date and time of the trusted application, and an internet protocol address of a system that executes the trusted application.

10. The administrative server of claim 8, wherein one or more trusted application profiles are received from a system administrator.

11. The administrative server of claim 8, wherein the customer application is verified in response to each application constraint in a trusted application profile being satisfied by the customer application profile.

12. The administrative server of claim 8, wherein an audit record is created for the customer application in response to denying the attempt from the customer application to access the shared library.

13. The administrative server of claim 8, wherein determining an attempt from a customer application to access the shared library comprises intercepting a call to an API of the shared library from a function of the application.

14. The administrative server of claim 8, wherein responsive to verifying that the customer application can access the shared library further comprises storing the customer application profile in the security database as a trusted application profile.

15. A non-transitory computer-readable storage medium storing executable computer instructions for restricting access to a shared library within a computer security system, the instructions configured to, when executed by a hardware processor, perform steps comprising:
 storing, in a security database for each of a plurality of trusted applications, a trusted application profile identifying a set of application constraints each associated with an application property that must be satisfied before an application can access a shared library;
 detecting an attempt from a customer application to access the shared library;
 responsive to the attempt, generating a profile of the customer application, the customer application profile representative of a set of properties of the customer application, each property of the set of properties represented by the customer application profile corresponding to a constraint identified by a trusted application profile;
 retrieving, from the security database, a profile for each trusted application of a set of trusted applications;
 comparing the customer application profile to each retrieved trusted application profile by comparing each property of the customer application represented by the customer application profile to the corresponding constraint identified by the retrieved trusted application profile;
 responsive to a successful comparison between the customer application profile and at least one trusted application profile, verifying that the customer application can access the shared library;
 responsive to verifying that the customer application can access the shared library, allowing the attempt from the customer application to access the shared library; and
 responsive to not verifying that the customer application can access the shared library, denying the attempt from the customer application to access the shared library.

16. The computer-readable storage medium of claim 15, wherein each trusted application profile includes one or more of: a trusted application name, a trusted application user, a trusted application host id, a location of the trusted application within a computer system, an access date and time of the trusted application, and an internet protocol address of a system that executes the trusted application.

17. The computer-readable storage medium of claim 15, wherein one or more trusted application profiles are received from a system administrator.

18. The computer-readable storage medium of claim 15, wherein the customer application is verified in response to each application constraint in a trusted application profile being satisfied by the customer application profile.

19. The computer-readable storage medium of claim 15, wherein an audit record is created for the customer application in response to denying the attempt from the customer application to access the shared library.

20. The computer-readable storage medium of claim 15, wherein determining an attempt from a customer application to access the shared library comprises intercepting a call to an API of the shared library from a function of the application.

21. The computer-readable storage medium of claim 15, wherein responsive to verifying that the customer application can access the shared library further comprises storing the customer application profile in the security database as a trusted application profile.

\* \* \* \* \*